May 30, 1967 W. W. RIGROD 3,322,026
ATTENUATION MEASURING DEVICE USING AN OPTICAL MASER
Filed Oct. 21, 1953

BALANCED WEDGE ATTENUATOR
OF LOSSY DIELECTRIC

BALANCED WEDGE ATTENUATOR
COMPOSED OF TWO FLUID CELLS

INVENTOR
W. W. RIGROD
BY
ATTORNEY

United States Patent Office 3,322,026
Patented May 30, 1967

3,322,026
ATTENUATION MEASURING DEVICE USING
AN OPTICAL MASER
William W. Rigrod, Millington, N.J., assignor to Bell
Telephone Laboratories, Incorporated, New York,
N.Y., a corporation of New York
Filed Oct. 21, 1963, Ser. No. 317,698
5 Claims. (Cl. 88—14)

ABSTRACT OF THE DISCLOSURE

The use of an external-mirror maser as a sensitive absorption cell is described. Because a maser is a high-Q device, its power output is sensitive to small changes in cavity losses. Hence, it is well suited to the measurement of small absorption losses, as occur in gases and vapors, and in some liquids. Absorption measurements of a test sample placed within the maser cavity are made by noting the change in the setting of a calibrated attenuator required to maintain the same maser output when the test sample is removed from within the cavity. A balanced wedge attenuator of uniform optical thickness is also described.

This invention relates to optical masers and, more particularly, to the use of such masers as sensitive absorption measurement devices.

The advent of the optical maser, or laser, has made possible the generation and amplification of coherent electromagnetic wave energy over a frequency range which, for the purposes of this specification, is termed the optical frequency range and which extends from the far infrared region of the spectrum, through the visible, and through the ultraviolet region.

In addition to its usefulness as a signal generator, the maser is an extremely useful instrument of measurement in a region of the frequency spectrum that was not, heretofore, readily accessible.

Because a maser is a high-Q device, its power output is sensitive to small changes in resonator losses. It is, accordingly, well suited to the measurement of small absorption losses, as occur in gases and vapors and in some liquids.

It is, therefore, an object of this invention to utilize a maser as an absorption measuring device.

In accordance with the invention, absorption measurements are made using an external-mirror maser and a balanced attenuator. The sample to be measured is placed within the maser cavity and the resulting attenuation compared with that produced by a calibrated attenuator. To maintain uniform attenuation over the entire maser beam width and uniform beam deflection for all attenuator settings, a novel balanced wedge attenuator of uniform optical thickness is used.

These and other objects and advantages, the nature of the present invention, and its various features, will appear more fully upon consideration of the various illustrative embodiments now to be described in detail in connection with the accompanying drawings, in which.

Figure 1:
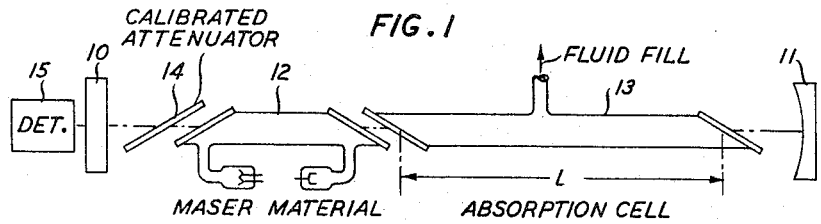
FIG. 1 is an illustrative embodiment of a maser absorption measuring device in accordance with the invention.

Referring to FIG. 1, there is shown an attenuation measuring device comprising an external-mirror maser oscillator which includes within the maser cavity an absorption cell and a calibrated attenuator. More specifically the maser cavity is formed by the pair of spaced mirrors 10 and 11 of which mirror 10 is partially transmissive to permit the abstraction of energy for external utilization. In FIG. 1 mirror 10 is a planar mirror and mirror 11 is shown as a concave mirror. These, however, are merely illustrative. Any combination of mirrors commonly used in the maser art can be employed.

Disposed within the cavity thus defined, is an active element housing the maser material. In FIG. 1, and for purposes of illustration, a tube 12 containing a direct-current (D.C.)-excited plasma column is used as the active element. The particular material that is used depends upon the frequency at which measurements are to be made. In the instant case, measurements were made at 1.153 microns using a mixture of helium and neon. (For a more detailed discussion of the helium-neon gas maser see the copending application of A. Javan, Ser. No. 277,651, filed May 2, 1963.) Similarly, other than D.C. pumping means for producing a population inversion in the maser material can be employed, as is well known in the art.

To minimize reflections, the ends of tube 12 are inclined at the Brewster angle.

Located within the maser cavity between tube 12 and mirror 11 is a cylindrical absorption cell 13 of length L, within which the fluid to be measured is contained. To minimize reflections from cell 13, its ends also are inclined at the Brewster angle.

Located between mirror 10 and tube 12 is a calibrated attenuator 14, the details of which will be described in greater detail hereinbelow.

Located external to the maser, and adjacent to mirror 10, is a radiation detector 15 for indicating the presence of electromagnetic radiation from the maser. Detector 15 can be of the simplest construction since all that it need be capable of doing is indicating when the output from the maser is at a specified level. Typically, a phototube or a thermopile is used as the detector. Advantageously, a bandpass filter, tuned to the frequency of the maser, is placed at the input to the detector to screen the latter from any spurious radiation.

To make a measurement, the gas or liquid to be measured is placed within the absorption cell 13 and the maser actuated. The calibrated attenuator 14 is set at some low value so as to give a convenient reading on the detector 15. The absorption cell is then emptied of the test sample and either filled with dry nitrogen or some other low-loss gas or, preferably, the absorption cell is evacuated. The attenuator is then readjusted so as to give the same output reading on the detector. The difference in the attenuator readings with the test sample in the absorption cell and with the absorption cell emptied, is the absorption of the sample material per length L. The absorption per unit length can then be computed.

Figure 2:
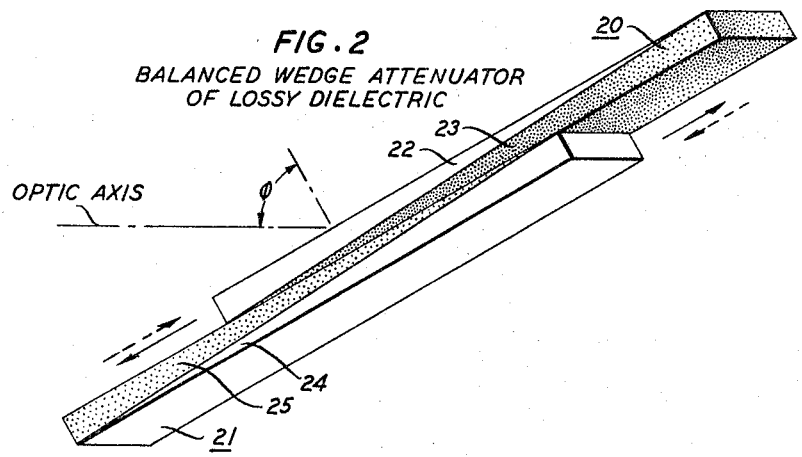
FIG. 2 is a balanced wedge attenuator of lossy dielectric material.

The calibrated attenuator 14 utilized in the above-described measurement must be capable of attenuating the optical beam uniformly over its entire width. In addition, since the attenuator is inclined at the Brewster angle to minimize reflections, the beam is displaced as it passes through the attenuator. Accordingly, the attenuator advantageously should be capable of displacing the beam uniformly a constant amount regardless of attenuator setting. In accordance with the invention, a pair of wedge attenuators, of the type shown in FIG. 2, are used to achieve these results.

Each of the elements 20 and 21 comprises two wedge-like sections which, together, form a rectangular parallelepiped. One of the wedge-like sections, such as section 22 of element 20, is a low-loss material whereas the other section 23 is a high-loss material. Both wedges have substantially the same index of refraction at the operating frequency.

Element 21 is of the same construction comprising a low-loss portion 24 and a high-loss portion 25. Individual elements of the type described are commercially available.

The two elements 20 and 21 are placed contiguous to each other, in the manner shown, such that when their adjacent surfaces are in mutual contact over their entire surface areas, the thick end of the high-loss wedge 23 of element 20 is adjacent to the narrow end of the high-loss wedge 25 of element 21. This is the condition for maximum attenuation. It will be noted that by using two wedges in the manner described, the total thickness of lossy material is the same for any ray passing through the attenuator. Hence, the attenuation is uniform over the entire beam width. Furthermore, the total thickness of material, including both the low-loss and the high-loss portions, is the same for all settings of elements 20 and 21. Thus, the two conditions, uniform attenuation and constant displacement of the optical beam are satisfied.

The attenuation is varied by displacing one or both of the elements with respect to each other by sliding them in a direction parallel to their common interface as indicated by the arrows.

Figure 3:
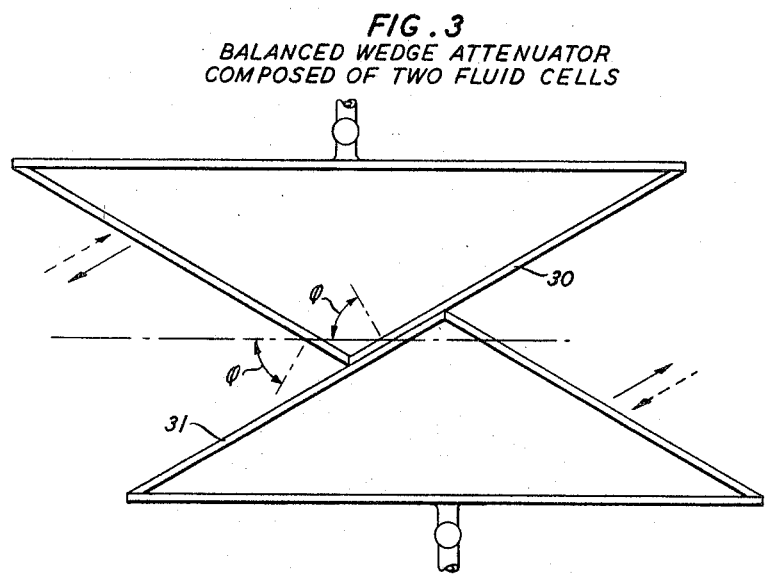
FIG. 3 is a balanced wedge attenuator composed of two fluid cells.

A second embodiment of the balanced attenuator, shown in FIG. 3, comprises two trough-like cells 30 and 31 with Brewster-angle windows. The cells are filled with a material of known attenuation. As before, the attenuation is varied by sliding one or both of the identical symmetrical wedges parallel to their common interface. Because of the symmetry of the two cells, there is no variation in the lateral displacement of the beam with changes in the attenuator setting.

In all cases it is understood that the above-described arrangements are illustrative of only a small number of the many possible specific embodiments which can represent applications of the various principles of the invention. For example, instead of using Brewster angle windows on the absorption cell, the windows can be oriented normal to the beam direction and reflections minimized by means of an anti-reflecting coating. Similarly, the calibrated attenuator can be oriented normal to the incident beam and, if necessary, an anti-reflecting coating used to minimize reflections. In this latter arrangement there is no displacement of the beam and hence there is no restrictions on the relative indices of refraction of the low-loss wedge and the high-loss wedge comprising each of the attenuator elements 20 and 21. Thus, numerous and other varied embodiments may be devised in accordance with these principles by those skilled in the art without departing from the spirit and scope of the invention.

What is claimed is:
1. Attenuation measurement equipment comprising:
a maser including a maser material disposed within a resonant cavity;
means for housing within said cavity a sample of a material to be measured;
a variable calibrated attenuator disposed within said cavity;
said attenuator comprising two substantially identical wedges of lossy material having a common interface;
means for sliding said wedges in a direction parallel to said interface;
and means for measuring the output from said maser.
2. The equipment according to claim 1 wherein;
said attenuator comprises two trough-like cells;
and means for filling said cells with a fluid of known attenuation.
3. The equipment according to claim 1 wherein;
said attenuator comprises two rectangular parallelepiped elements each of which comprises a low-loss wedge section and a high-loss wedge section.
4. Attenuation measuring equipment comprising:
an optical maser including a resonant cavity;
a sample of material to be measured disposed within said cavity;
a variable calibrated attenuator disposed within said cavity and oriented at the Brewster angle with respect to the maser beam;
said attenuator comprising two substantially identical rectangular parallelepiped elements each of which includes a wedge of low-loss material and a wedge of high-loss material;
said elements being in contact with each other over a portion of their adjacent surfaces;
means for sliding said wedges with respect to each other in a direction parallel to said surfaces;
and means for measuring the output from said maser.
5. A balanced attenuator comprising two substantially identical rectangular parallelepiped elements each of which includes a wedge of low-loss material and a wedge of high-loss material;
said elements being in contact with each other over a portion of their adjacent surfaces with the thick end of the high-loss wedge of each of said elements adjacent to the narrow end of the high-loss wedge of the other of said elements;
and means for sliding said wedges with respect to each other in a direction parallel to said surfaces.

References Cited

UNITED STATES PATENTS 2,682,801   7/1954   Davidson et al. _____ 88—14

JEWELL H. PEDERSEN, *Primary Examiner.*

DAVID H. RUBIN, *Examiner.*

P. R. MILLER, *Assistant Examiner.*